(12) United States Patent
Kim

(10) Patent No.: US 8,778,517 B2
(45) Date of Patent: Jul. 15, 2014

(54) SECONDARY BATTERY

(75) Inventor: Youngho Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 501 days.

(21) Appl. No.: 12/892,503

(22) Filed: Sep. 28, 2010

(65) Prior Publication Data

US 2011/0117392 A1    May 19, 2011

(30) Foreign Application Priority Data

Nov. 19, 2009  (KR) .................. 10-2009-0111855

(51) Int. Cl.
*H01M 2/34*    (2006.01)

(52) U.S. Cl.
USPC ............................................. 429/7

(58) Field of Classification Search
CPC ........... H01M 2/34; H01M 2/00; H01M 2/02; H01M 2/04; H01M 2/10
USPC ............................................ 429/7
See application file for complete search history.

(56) References Cited

U.S. PATENT DOCUMENTS

| 8,053,103 B2 * | 11/2011 | Byun et al. ............ 429/162 |
| 2003/0211385 A1 | 11/2003 | Yamazaki et al. |
| 2005/0208346 A1 | 9/2005 | Moon et al. |
| 2009/0280398 A1 | 11/2009 | Park et al. |
| 2011/0045322 A1 | 2/2011 | Baek et al. |

FOREIGN PATENT DOCUMENTS

| KR | 10-2005-0081175 | 8/2005 |
| KR | 10-0685605 B1 | 2/2007 |
| KR | 10-2008-0034723 | 4/2008 |
| KR | 10-2008-0058597 | 6/2008 |
| KR | 10-2009-0026697 | 3/2009 |
| KR | 10-2009-0064089 | 6/2009 |
| KR | 10-2009-0117315 | 11/2009 |
| WO | WO 2008/066222 A1 | 6/2008 |

OTHER PUBLICATIONS

KIPO Office action dated Mar. 28, 2011, for Korean priority Patent application 10-2009-0111855, noting listed references in this IDS.

* cited by examiner

*Primary Examiner* — Karie O'Neill Apicella
(74) *Attorney, Agent, or Firm* — Christie, Parker & Hale, LLP

(57) ABSTRACT

A secondary battery including a bare cell having an electrode terminal provided at a side of the bare cell and a cap plate insulated from the electrode terminal; a protective circuit module provided on a surface of the bare cell and electrically connected to the electrode terminal and the cap plate; a secondary protective element connecting the electrode terminal to the protective circuit module and provided between the bare cell and the protective circuit module; and a holder provided between the bare cell and the protective circuit module to support the protective circuit module, and including an accommodation part accommodating the secondary protective element, wherein at least one of the holder or the protective circuit module includes at least one passage.

20 Claims, 4 Drawing Sheets

SECONDARY BATTERY

CROSS-REFERENCE TO RELATED APPLICATION

This application claims the benefit of Korean Patent Application No. 10-2009-0111855, filed Nov. 19, 2009, in the Korean Intellectual Property Office, the disclosure of which is incorporated herein by reference.

BACKGROUND

1. Field

Aspects of the present invention relate to a secondary battery.

2. Description of the Related Art

In recent years, along with the rapid advances in electronics, communications and computers, portable electronic apparatuses have come into widespread use. A secondary battery is generally used as a power source because it is rechargeable in consideration of practical use for such portable electronic apparatuses.

The secondary battery is generally configured to include a can accommodating an electrode assembly having a first electrode, a second electrode, and a separator interposed between the first and second electrodes and insulating the first and second electrodes from each other. The secondary battery also includes a protective circuit module at an upper portion of the can to control charging and discharging of the secondary battery and operations of the secondary battery.

Alternatively, the secondary battery may also have a secondary protective element provided between the can and the protective circuit module and protecting the secondary battery from being over-heated. The secondary protective element senses heat generated in the can and, when the can is heated to a predetermined temperature or higher, prohibits current from flowing through the secondary battery.

SUMMARY

Aspects of the present invention provide a secondary battery configured to easily transfer heat to a secondary protective element provided between a protective circuit module and a bare cell.

Aspects of the present invention provide a secondary battery configured to easily dissipate heat from a secondary protective element provided between a protective circuit module and a bare cell.

Aspects of the present invention provide a secondary battery including a bare cell having an electrode terminal provided a side of the bare cell and a cap plate insulated from the electrode terminal; a protective circuit module provided on a surface of the bare cell and electrically connected to the electrode terminal and the cap plate; a secondary protective element connecting the electrode terminal to the protective circuit module and provided between the bare cell and the protective circuit module; and a holder provided between the bare cell and the protective circuit module to support the protective circuit module, and including an accommodation part accommodating the secondary protective element, wherein at least one of the holder or the protective circuit module includes at least one passage.

According to aspects of the present invention, a secondary battery configured to easily transfer heat to a secondary protective element provided between a protective circuit module and a bare cell can be achieved. In addition, according to aspects of the present invention, a secondary battery configured to easily dissipate heat from a secondary protective element provided between a protective circuit module and a bare cell can be achieved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
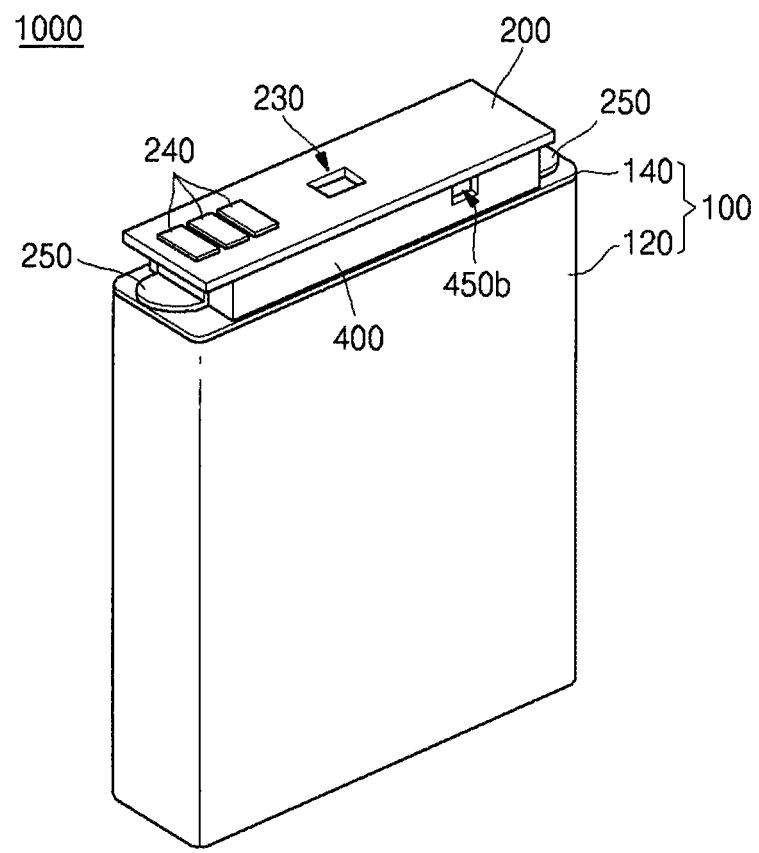
FIGS. 1 and 2 illustrate secondary batteries according to exemplary embodiments of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
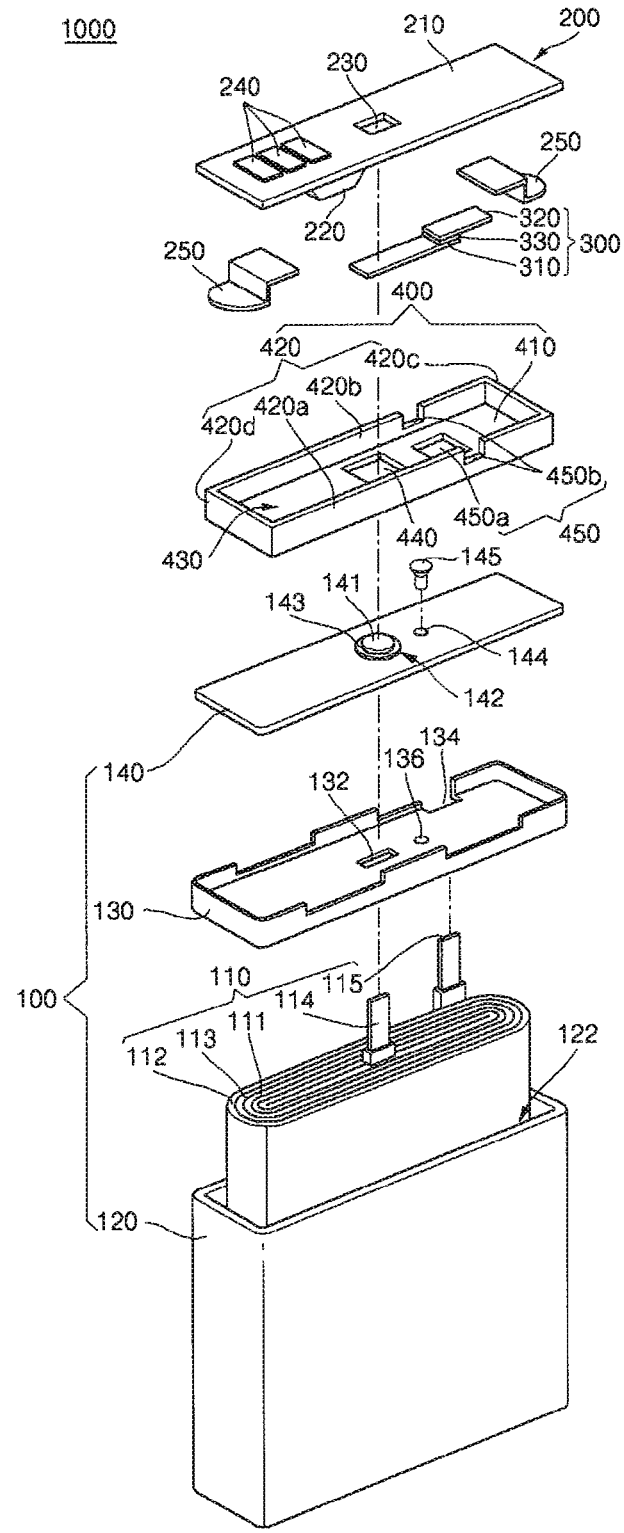
Figure 3:
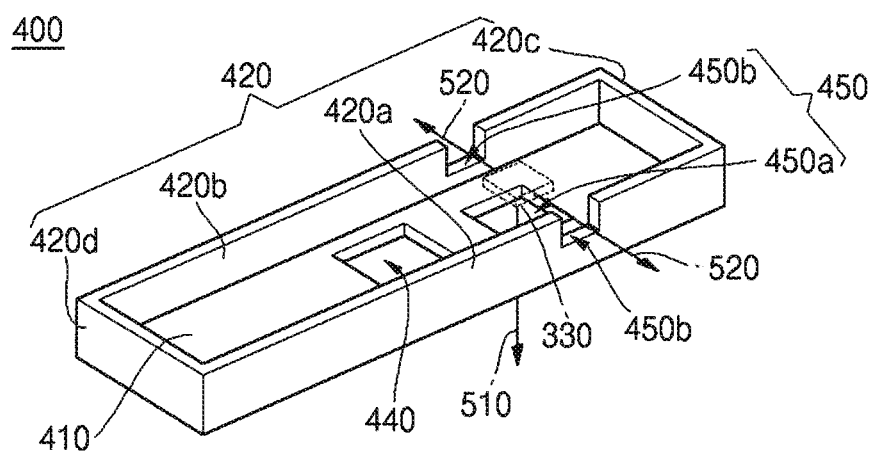
FIGS. 3 and 4 illustrate holders as parts of the secondary batteries shown in FIGS. 1 and 2.

FIG. 1 illustrates a secondary battery according to an exemplary embodiment of the present invention. FIG. 2 is an exploded perspective view of the secondary battery shown in FIG. 1. FIG. 3 is a detailed view of a holder as a part of the secondary battery shown in FIG. 2.

Figure 4:
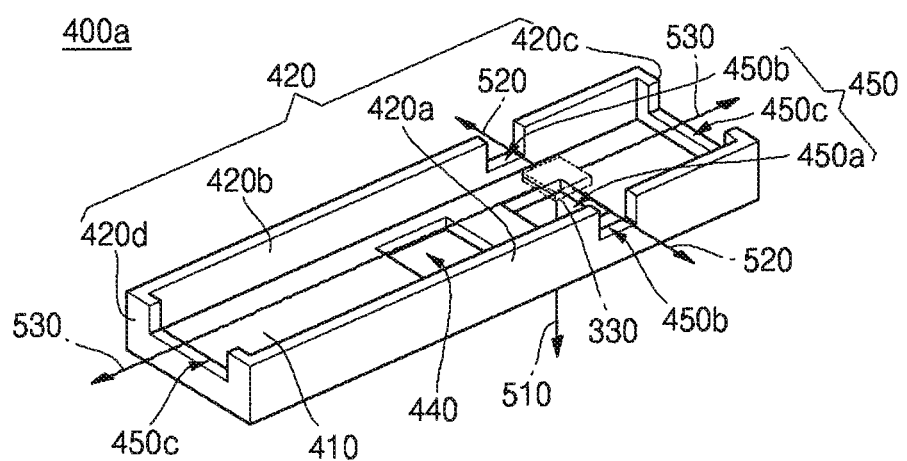

According to FIGS. 1, 2 and 4, the secondary battery 1000 according to an embodiment of the present invention includes a bare cell 100, a protective circuit module 200, a secondary protective element 300, and a holder 400. The bare cell 1000 includes an electrode assembly 110, a can 120, an insulation case 130, and a cap plate 140.

The electrode assembly 110 includes a first electrode 111, a second electrode 112, and a separator 113 interposed between the first and second electrodes 111 and 112 and insulating the first and second electrodes 111 and 112 from each other. The electrode assembly 110 is a wound electrode assembly in which the first electrode 111, the separator 113, and the second electrode 112 are wound in a jelly-roll configuration. However, aspects of the present invention are not limited thereto and the electrode assembly 110 may be a stacked electrode assembly in which a first electrode, a separator and a second electrode are repeatedly stacked, or a folding-type electrode assembly in which a first electrode, a separator and a second electrode are folded in zigzags.

The first electrode 111 is a positive electrode, and the second electrode is a negative electrode. However, aspects of the present invention are not limited thereto and the first electrode 111 may be a negative electrode, and the second electrode may be a positive electrode. In addition, the electrode assembly 110 includes a first electrode tab 114 extending from the first electrode 111 and a second electrode tab 115 extending from the second electrode 112.

An opening 122 is provided at a side of the can 120, and the electrode assembly 110 is accommodated in the can 120 through the opening 122. The insulation case 130 is inserted into the opening 122 of the can 120 accommodating the electrode assembly 110. The insulation case 130 restricts movement of the electrode assembly 110 inside the can 120 and insulates the cap plate 140 and the electrode assembly 110 from each other, which will later be described.

The insulation case 130 includes a first through-hole 132 and a second through-hole 134 through which the first electrode tab 114 and the second electrode tab 115 pass, respectively. In addition, the insulation case 130 includes an inlet 136 to inject electrolyte into the can 120 accommodating the electrode assembly 110.

The cap plate 140 covers the can 120 accommodating the electrode assembly 110 and seals the can 120. The cap plate 140 includes an electrode terminal 141 provided at a predetermined position.

The electrode terminal 141 is disposed so as to extend into a terminal hole 142 provided at a predetermined location of the cap plate 140. Here, the electrode terminal 141 is in a state in which it is insulated from the cap plate 140. A gasket 143 inserted into the terminal hole 142 insulates the electrode terminal 141 from the cap plate 140 and prevents the electrolyte injected into the can 120 from leaking outside the can 120.

The electrode terminal 141 is electrically connected to the first electrode tab 114 passing through the first through-hole 132 and extending therefrom. The cap plate 140 is electrically connected to the second electrode tab 115 passing through the second through-hole 134 and extending therefrom.

An electrolyte injection hole 144 is provided in the cap plate 140 to inject electrolyte into the can 120 accommodating the electrode assembly 110. After the electrolyte is injected through the electrolyte injection hole 144, the electrolyte injection hole 144 is sealed using a hole plug 145, thereby hermetically sealing the can 120.

The protective circuit module 200 is provided on a top surface of the bare cell 100 and on top of the cap plate 140. The protective circuit module 200 includes a control element 220, such as an integrated circuit (IC) device, mounted on a bottom surface of a printed circuit board (PCB) 210, that is, a surface of the bare cell 100 facing the cap plate 140. The control element 220 controls charging and discharging of the secondary battery 1000 and operations of the secondary battery 1000.

The PCB 210 of the protective circuit module 200 includes a first welding hole 230 passing through the PCB 210 at a predetermined position corresponding to the electrode terminal 141. In addition, the protective circuit module 200 includes an external terminal 240 provided on a top surface of the PCB 210 to electrically connect the secondary battery 1000 to an external device.

The protective circuit module 200 is electrically connected to the electrode terminal 141 and the cap plate 140. The protective circuit module 200 and the electrode terminal 141 are electrically connected to each other by the secondary protective element 300, which will later be described. A connection member 250 physically connects the protective circuit module 200 and the electrode terminal 141 to each other.

The connection member 250 is provided at both ends of the protective circuit module 200, respectively. One side end of the connection member 250 is connected to the bottom surface of the protective circuit module 200 and the other side end is connected to the bottom surface of the cap plate 140. The connection member 250 and the bottom surface of the protective circuit module 200 are connected by one of soldering, welding such as laser welding or resistance welding, or using a fastening member such as a bolt. However, aspects of the present invention are not limited thereto, and other methods of connecting the connection member 250 to the protective circuit module 200 may be used. The connection member 250 allows the protective circuit module 200 and the cap plate 140 to be spaced apart from each other by a predetermined distance The secondary protective element 300 includes a first lead 310, a second lead 320, and a PTC (Positive Temperature Coefficient) element 330. The first lead 310 is electrically connected to the electrode terminal 141, and the second lead 320 is electrically connected to the protective circuit module 200. The PTC element 330 is disposed between the first lead 310 and the second lead 320. The secondary protective element 300 prevents current from flowing through the secondary battery 1000 when the secondary battery 1000 is overheated and exceeds a predetermined temperature.

The holder 400 includes a bottom portion 410 having an area approximately equal to an area of the protective circuit module 200 or an area smaller than the area of the protective circuit module 200, and a sidewall portion 420 extending from an outer periphery of the bottom portion 410 in an upward direction facing the bottom surface of the protective circuit module 200. Here, the sidewall portion 420 includes four sidewalls 420a, 420b, 420c, and 420d. First and second long sidewalls 420a and 420b extend from the outer periphery of longer sides of the bottom portion 410, and first and second short sidewalls 420c and 420d extend from the outer periphery of shorter sides of the bottom portion 410 and connect first and second long sidewalls 420a and 420b to each other.

An accommodation part 430 is provided in the holder 400 by the bottom portion 410 and the sidewall portion 420. The control element 220 and the secondary protective element 300 are accommodated in the accommodation part 430. In addition, the holder 400 supports the protective circuit module 200 using the sidewall portion 420. The bottom portion 410 includes a second welding hole 440 through which the electrode terminal 141 protrudes at a predetermined position.

As described above, the secondary battery 1000 is assembled by fastening the connection member 250 to the cap plate 140. Additionally, the secondary battery 100 is assembled using the first welding hole 230 and the second welding hole 440 by fastening the first lead 310 of the secondary protective element 300 to the electrode terminal 141. The fastening of the first lead 310 with the electrode terminal 141 is done by welding such as laser welding or resistance welding, however, aspects of the present invention are not limited thereto and other methods of fastening may be used. The first welding hole 230 and the second welding hole 440 serve as a passage through which a laser beam or a resistance welding rod passes during the laser welding or resistance welding.

As described above, the secondary protective element 300 includes the PTC element 330, which is made of a material having a resistance which varies according to a temperature. Thus, the secondary protective element 300 senses heat generated due to an abnormality occurring to the inside of the bare cell 100, specifically, the electrode assembly 110, and prevents a current from flowing through the secondary battery 1000 according to the abnormality. Therefore, the secondary protective element 300, particularly, the PTC element 330, is constructed to easily transfer/dissipate heat from/to the bare cell 100, thereby accurately detecting whether the bare cell 100 is heated to a predetermined temperature or higher.

In order to increase sensitivity of the secondary protective element 300 sensing whether a temperature of the secondary battery 1000, particularly, the bare cell 100, has increased to the predetermined level or higher, the secondary battery 1000 includes one or more passages 450 provided in the holder 400. The passage 450 is provided at the bottom portion 410 or the sidewall portion 420 of the holder 400. Here, the passages 450 are included in both the bottom portion 410 and the sidewall portion 420, as shown in FIG. 2. The one or more passages 450 allow the secondary protective element 300, particularly, the PTC element 330, to easily transfer and/or dissipate heat.

Each of the one or more passages 450 shown in FIG. 2 may perform different functions. An entrance passage 450a allows heat generated from the bare cell 100 to easily enter the accommodation part 430 of the holder 400. An exit passage 450b allows heat of the PTC element 330 or the accommodation part 430 to easily exit to the outside of the PTC element 330 or the accommodation part 430. That is to say, the entrance passage 450a transfers heat generated from the bare cell 100 to an internal space of the accommodation part 430 and the PTC element 330. The exit passage 450b discharges heat emanated from the internal space of the accommodation part 430 and the PTC element 330 to the outside.

As shown in FIG. 3, the passages 450 are provided at a position corresponding to the secondary protective element 300, in particular, the PTC element 330. That is to say, the passages 450 are positioned in a predetermined region of the holder 400 corresponding to the PTC element 330. The predetermined region also corresponds to a region directed downward, as indicated by an arrow labeled 510, or a region directed upward, as indicated by an arrow labeled 530, with respect to the PTC element 330.

Therefore, as shown in FIG. 3, the one or more passages 450, particularly, the entrance passage 450a, has an area equal to or a larger than an area of the PTC element 330 when viewed from the downward direction 510.

In addition, the one or more passages 450, particularly, the exit passage 450b, are formed to have an area equal to or a larger than an area of the PTC element 330 at a predetermined position of the sidewall portion 420 of the holder 400. The predetermined position of the sidewall portion 420 is along an arrow labeled 520, which extends in a horizontal direction with respect to the PTC element 300, to intersect the first long sidewall 420a and the second long sidewall 420b. In other words, the exit passage 450b has a surface area in a vertical plane that is equal to or larger than an area of the PTC element 330 in a horizontal plane.

FIG. 3 illustrates that the exit passage 450b is provided one by one at the first long sidewall 420a and the second long sidewall 420b, respectively. However, aspects of the present invention are not limited thereto and the exit passage 450b may be provided at any one of the first long sidewalls 420a and the second long sidewalls 420b.

Therefore, the secondary battery 1000, according to an exemplary embodiment of the present invention, is configured to include the bare cell 100, the protective circuit module 200, the secondary protective element 300 and the holder 400. The secondary protective element 300 is accommodated in the accommodation part 430 of the holder 400. The protective circuit module 200 is mounted on a top surface of the cap plate 140 with the connection member 250. The passage 450, specifically any one or both of the entrance passage 450a and the exit passage 450b, are disposed in the holder 400.

With the above described structure, the secondary battery 1000 is configured to include the holder 400 that allows heat generated from the bare cell 100 to easily enter through the entrance passage 450a to then be transferred to the secondary protective element 300. Accordingly, the secondary protective element 300 becomes sensitive to a temperature change of the bare cell 100. Thus, the current flowing through the secondary battery 1000 can be interrupted when the bare cell 100 is heated to a predetermined temperature or higher.

In addition, the secondary battery 1000, according to an exemplary embodiment of the present invention, is configured to include the holder 400 to allow heat emanated from the secondary protective element 300 to easily exit to the outside of the PTC element 330 through the exit passage 450b. Since the holder 400, including the exit passage 450b, allows the secondary protective element 300 to be easily cooled, the accommodation portion 430 or the secondary protective element 300 also operates according to a temperature change of the bare cell 100.

FIG. 4 illustrates a holder that is a part of the secondary battery shown in FIG. 2. Referring to FIG. 4, the secondary battery, according to an embodiment of the present invention, is substantially the same as the secondary battery 1000 shown in FIGS. 1 through 3, except for a holder 400a. For brevity of explanation, only the holder 400a is illustrated in FIG. 4 and other elements are not illustrated.

The holder 400a shown in FIG. 4 is a modification of the holder 400 described above with reference to FIG. 3. That is to say, the holder 400a includes passages 450, including an entrance passage 450a provided at the bottom portion 410, exit passages 450b provided at a first long sidewall 420a and a second long sidewall 420b, and exit passages 450c provided at a first short sidewall 420c and a second short sidewall 420d.

In other words, the secondary battery 1000 includes passages 450 provided at the holder 400a. The passages 450 include the entrance passage 450a provided at the bottom portion 410, the exit passages 450b provided at the first and second long sidewalls 420a and 420b, and the exit passages 450c provided at the first and second short sidewalls 420c and 420d.

The exit passages 450c provided at the first and second short sidewalls 420c and 420d are formed to have an area equal to or larger than an area of the PTC element 330. The exit passages 450c are provided at predetermined positions of the first and second short sidewalls 420c and 420d along an arrow labeled 530 which extends in a horizontal direction with respect to the PTC element 330. In other words, the predetermined points on the first and second short sidewalls 420c and 420d are positioned closest to the PTC element 330 in the horizontal direction 530.

Figure 5:
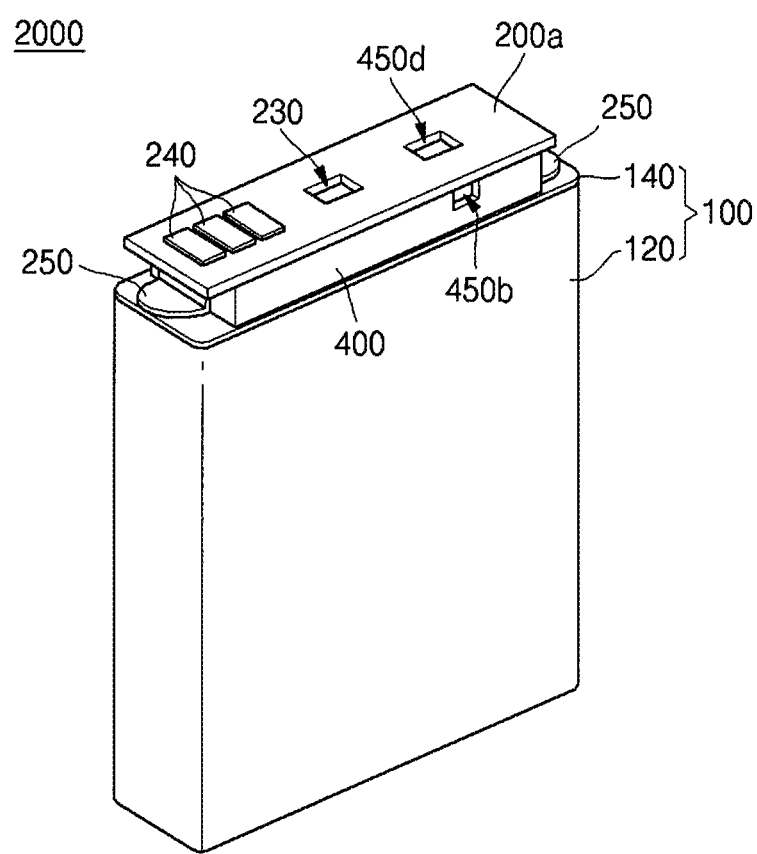
FIG. 5 illustrates a secondary battery according to another exemplary embodiment of the present invention.

FIG. 5 illustrates a secondary battery according to another exemplary embodiment of the present invention. Referring to FIG. 5, the secondary battery 2000, according to the present embodiment of the present invention, is substantially the same as the secondary battery 1000 illustrated in FIG. 2, except that an exit passage 450d is further provided at a protective circuit module 200a. The exit passage 450d provided at the protective circuit module 200a allows heat emanated from the accommodation portion 430 or the secondary protective element 300 to be easily dissipated.

The exit passage 450d is provided at a predetermined region of the protective circuit module 200a. The predetermined region of the protective circuit module 200a is disposed is a direction opposite the arrow 510 illustrated in FIGS. 3 and 4. The exit passage 450d corresponds to the entrance passage 450a of the secondary battery 1000 described above with reference to FIGS. 1 through 3 in terms of position and configuration, however, the exit passage 450d is disposed on the circuit module 200a.

That is to say, the secondary battery 2000 has the protective circuit module 200a with the exit passage 450d allowing heat emanated from the accommodation portion 430 or the secondary protective element 300 to be easily dissipated. Accordingly, the secondary protective element 300 becomes more sensitive to a temperature change of the secondary battery 2000, and specifically, to a temperature change of the bare cell 100.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
   a bare cell having an electrode terminal provided at a side of the bare cell and a cap plate insulated from the electrode terminal;
   a protective circuit module provided on the cap plate and electrically connected to the electrode terminal and the cap plate;
   a secondary protective element connecting the electrode terminal to the protective circuit module and provided between the bare cell and the protective circuit module; and
   a holder provided between the cap plate and the protective circuit module to support the protective circuit module and including an accommodation part accommodating the secondary protective element,
   wherein at least one of the holder or the protective circuit module includes at least one passage.

2. The secondary battery of claim 1, wherein the passage is an entrance passage through which heat is transferred to the accommodation part or an exit passage through which heat is emanated from the accommodation part.

3. The secondary battery of claim 1, wherein the holder comprises:
   a bottom portion having a same area as the protective circuit module or a smaller area than the protective circuit module; and
   a sidewall portion extending from an outer periphery of the bottom portion in an upward direction,
   wherein the passage is provided at the bottom portion or the sidewall portion.

4. The secondary battery of claim 1, wherein the protective circuit module comprises:
   a control element mounted on a bottom surface of the protective circuit module and accommodated in the accommodation part of the holder; and
   an external terminal provided on a top surface of a printed circuit board (PCB) which is opposite to the bottom surface of the protective circuit module.

5. The secondary battery of claim 1, wherein the secondary protective element comprises:
   a first lead electrically connected to the electrode terminal;
   a second lead electrically connected to the protective circuit module; and
   a positive temperature coefficient (PTC) element disposed between the first lead and the second lead,
   wherein the passage is provided at a predetermined region of the holder corresponding to the PTC element or at a predetermined region of the protective circuit module corresponding to the PTC element.

6. The secondary battery of claim 5, wherein the passage is provided at the predetermined region of the holder, and the predetermined region of the holder corresponds to a region that is below the PTC element.

7. The secondary battery of claim 5, wherein the passage is provided at the predetermined region of the holder, and the predetermined region of the holder corresponds to a region that is horizontally adjacent to the PTC element.

8. The secondary battery of claim 1, wherein the holder is made of at least one material of synthetic resin, rubber or silicon.

9. The secondary battery of claim 5, wherein the passage is provided at the predetermined region of the protective circuit module, and the predetermined region of the protective circuit module corresponds to a region that is above the PTC element.

10. The secondary battery of claim 1, wherein the secondary battery further comprises:
    a connection member connecting both ends of the protective circuit module to the cap plate.

11. The secondary battery of claim 1, wherein the bare cell comprises:
    an electrode assembly comprising:
       a first electrode having a first electrode tab;
       a second electrode having a second electrode tab; and
       a separator interposed between the first electrode and the second electrode and insulating the first electrode and the second electrode from each other; and
    a can having an opening at a side of the can to accommodate the electrode assembly,
    wherein the cap plate seals the opening at the side of the can and is electrically connected to the second electrode tab and the electrode terminal is connected to the first electrode tab.

12. The secondary battery of claim 1, wherein the bare cell comprises an insulation case disposed below the cap plate.

13. A holder holding a protective circuit module of a secondary battery including a bare cell having a cap plate and a secondary protective circuit element having a positive temperature coefficient (PTC) element, the holder comprising:
    a bottom portion having an area equal to or less than an area of the protective circuit module;
    sidewall portions extending in an upward direction along an outer periphery of the bottom portion; and
    at least one passage,
    wherein the holder is disposed below the protective circuit module and above the bare cell of the secondary battery, and wherein the protective circuit module is on the cap plate.

14. The holder of claim 13, wherein the at least one passage comprises an entry passage disposed in the bottom portion at a position corresponding to the PTC element.

15. The holder of claim 14, wherein an area of the entry passage is equal to or greater than a surface area of the PTC element.

16. The holder of claim 13, wherein the at least one passage comprises at least one exit passage disposed on at least one sidewall portion.

17. The holder of claim 16, wherein an area of the exit passage is equal to or greater than a surface area of the PTC element.

18. The holder of claim 13, the holder further comprising a welding hole exposing an electrode terminal of the bare cell.

19. The holder of claim 13, wherein the bottom portion is substantially rectangular and wherein the sidewall portions extend in an upward direction along an outer periphery of each side of the bottom portion, the bottom portion and the sidewall portions defining a cavity configured to receive the secondary protective circuit element.

20. The holder of claim 13, wherein the at least one passage comprises an entry passage located in the bottom portion at a position corresponding to the PTC element and at least one exit passage located in at least one sidewall portion.

* * * * *